United States Patent [19]

Godai et al.

[11] Patent Number: 4,716,785
[45] Date of Patent: Jan. 5, 1988

[54] PLAYBACK INDUSTRIAL ROBOT PROVIDED WITH A DRIVING DEVICE HAVING AN ELECTRIC MOTOR

[75] Inventors: Hiroshi Godai, Tokyo; Yukio Otani, Kawasaki; Noriyuki Utsumi, Yokohama, all of Japan

[73] Assignee: Tokico Ltd., Japan

[21] Appl. No.: 897,614

[22] Filed: Aug. 18, 1986

[30] Foreign Application Priority Data

Aug. 20, 1985 [JP]  Japan .................. 60-126739[U]
Sep. 11, 1985 [JP]  Japan .................. 60-200781[U]

[51] Int. Cl.$^4$ .................. F16H 33/00; F16H 35/00; F16H 37/00
[52] U.S. Cl. .................. 74/640; 901/23; 901/25; 901/4; 74/606 R
[58] Field of Search .................. 74/640, 421 A, 803, 74/606 R; 901/23, 25, 4; 192/91 A, 20

[56] References Cited

U.S. PATENT DOCUMENTS

| | | | |
|---|---|---|---|
| 3,447,385 | 6/1969 | Humphreys | 74/640 X |
| 3,648,143 | 3/1972 | Harper et al. | 901/25 X |
| 4,030,617 | 6/1977 | Richter | 901/23 X |
| 4,096,766 | 1/1978 | Pardo et al. | 74/640 |
| 4,355,710 | 10/1982 | Schilling | 192/91 A |
| 4,398,110 | 8/1983 | Flinchbaugh | 901/23 X |
| 4,431,366 | 2/1984 | Inaba et al. | 901/23 X |
| 4,512,710 | 4/1985 | Flatau | 74/640 X |
| 4,566,352 | 1/1986 | Stift | 74/640 |
| 4,601,684 | 7/1986 | Geary et al. | 74/606 A X |

FOREIGN PATENT DOCUMENTS 0121844 10/1984 European Pat. Off. .......... 74/640
221442  7/1968 U.S.S.R. ........................... 74/640

Primary Examiner—Leslie Braun
Assistant Examiner—Dirk Wright
Attorney, Agent, or Firm—Andrus, Sceales, Starke & Sawall

[57] ABSTRACT

A playback industrial robot comprises at least one driving device provided with an electric motor having a motor shaft. The driving device comprises a reduction gear mechanism for reducing a rotational speed of the motor shaft of the motor, an output shaft for operating the robot, a clutch mechanism which is in a disengaged state when the output shaft rotates in a teaching mode so that the reduction gear mechanism does not act as a load, a mechanism for putting the clutch mechanism in an engaged state depending on supply and cutting off of the supply of compressed fluid when the teaching mode is started, and a case for accommodating the motor, the output shaft and the above mechanisms. The clutch mechanism comprises a movable clutch member applied with a rotary force depending on forward and backward rotations of the motor and guide members arranged in parallel to the output shaft at positions separated from a center of the output shaft toward an outer peripheral direction thereof. The movable clutch member is provided on the guide members so as to be non-rotatable but movable in an axial direction of the output shaft.

4 Claims, 5 Drawing Figures

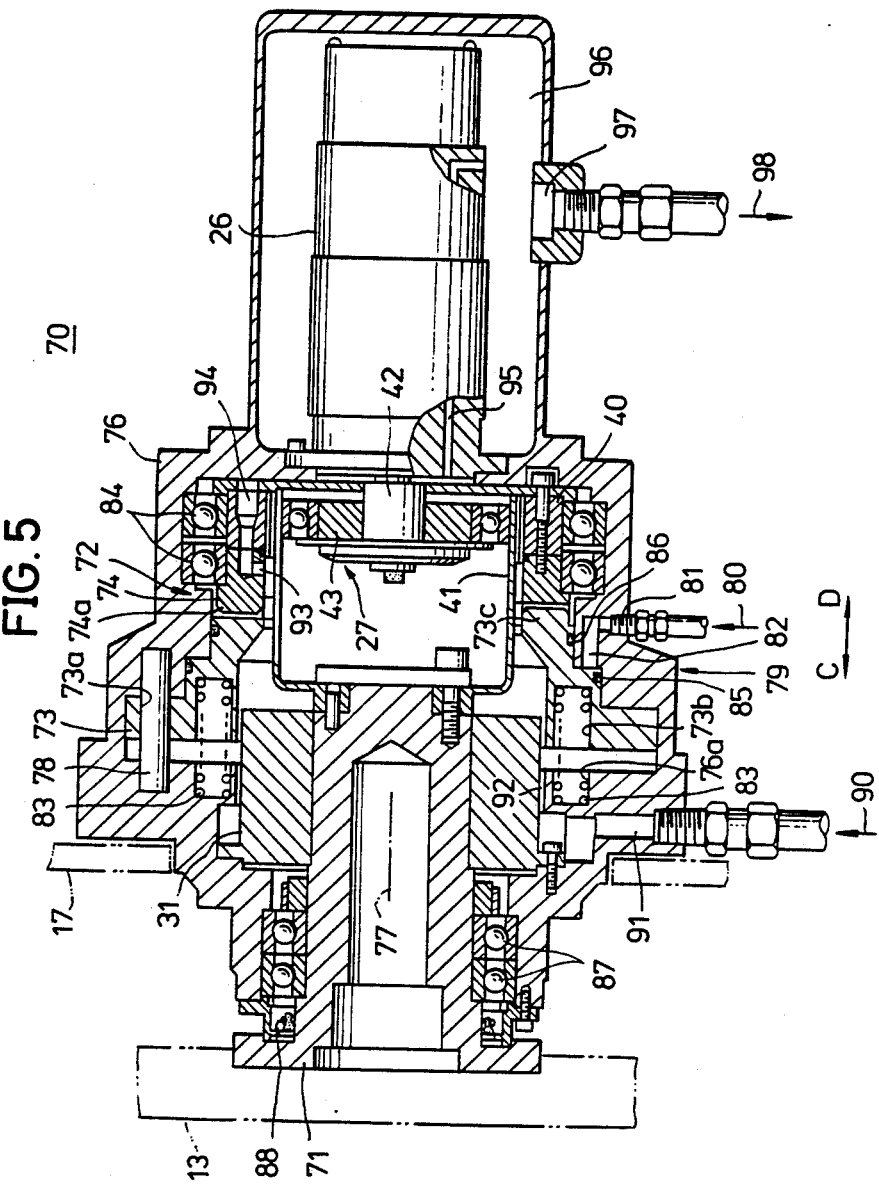

PLAYBACK INDUSTRIAL ROBOT PROVIDED WITH A DRIVING DEVICE HAVING AN ELECTRIC MOTOR

BACKGROUND OF THE INVENTION

The present invention generally relates to industrial playback robots, and more particularly to an industrial playback robot which is provided with a driving device having an electric motor as a driving source thereof and can be taught for use in carrying out a painting operation and the like.

A reduction gear mechanism for reducing a rotational speed of an electric motor is provided within a driving device of an industrial robot, and the robot is operated by the repeated forward and backward rotations of the electric motor.

A playback robot must be taught before the robot can perform a normal repeating operation, and it must be possible to teach the robot by use of only a small operating force. For this reason, a clutch mechanism is provided between the electric motor and a member which is driven by the electric motor, together with the reduction gear mechanism. The clutch mechanism is normally in an engaged state (transmitting state) for rotationally driving the member, and is in a disengaged state (non-transmitting state) during the teaching operation. As a result, the teaching operation can be performed smoothly without moving the reduction gear mechanism, that is, in a state where a load introduced by the reduction gear mechanism is released.

The clutch mechanism may be of a type which uses a disc and a pad, or may be or a type which uses a clutch gear pair and separates one of the clutch gears from the other confronting clutch gear. When the clutch mechanism using the disc and the pad is employed in a part of the robot where a large torque is required, there is a problem in that this clutch mechanism becomes bulky. Hence, the clutch mechanism using the clutch gear pair is generally used in the robot.

The clutch gear of the clutch mechanism is fitted on a spline shaft which is an output shaft of the reduction gear mechanism, and the clutch gear is movable in an axial direction of the spline shaft but is not rotatable independently of the spline shaft. When the robot is operated, the clutch gear rotates unitarily with the spline shaft which rotates in forward and backward directions so as to transmit the rotation of the output shaft of the reduction gear mechanism to the robot.

Since a center hole of the clutch gear of the clutch mechanism is inserted with the spline shaft, there is play in a circumferential direction of the spline shaft at a part where the clutch gear is fitted. For this reason, a rotary play angle of the spline shaft, that is, a rotary angle required for the clutch gear to start rotation from a point where the spline shaft starts to rotate in a direction opposite to a direction in which the spline shaft had been rotating, is enlarged and is relatively large at a position separated from the center of the spline shaft. This rotary play angle of the spline shaft deteriorates the rotational accuracy of the output shaft of the driving device and the operating accuracy of the robot is accordingly deteriorated. In addition, there are problems in that the play generates contact noise and the durability of the driving device becomes poor because of the contact caused by the play.

On the other hand, equipments used in flammable gas must be provided with the so-called explosion-proof apparatus (or gas proof apparatus) in order to prevent the flammable gas from being ignited and ensure safety.

One example of the equipment used under such a flammable condition is a painting robot used for painting. A conventional explosion-proof apparatus provided in the painting robot comprises an airtight container for containing only the electric motor out of the electric motor, the reduction gear mechanism, the clutch mechanism and a position detecting mechanism which constitute the driving mechanism, and the airtight container isolates the electric motor from the flammable gas. Compressed air is supplied within the airtight container as a protecting gas for keeping the pressure inside the airtight container over the atmospheric pressure, so that the flammable gas is prevented from entering the airtight container even when the airtight container is damaged. As a result, the flammable gas is prevented from being ignited by sparks generated in the electric motor.

However, heat and sparks which cause ignition of the flammable gas may be generated in the reduction gear mechanism and the clutch mechanism. Hence, there is a problem from the point of view of the safety when the explosion-proof apparatus is designed to only isolate the electric motor from the flammable gas by the airtight container.

SUMMARY OF THE INVENTION

Accordingly, it is a general object of the present invention to provide a novel and useful industrial playback robot in which the problems described heretofore are eliminated.

Another and more specific object of the present invention is to provide an industrial playback robot in which a clutch mechanism for controlling operating and non-operating states of a reduction gear mechanism is provided on an output shaft of a driving device at a position separated from a center of the output shaft, the clutch mechanism is operated by compressed fluid and coil springs, and the reduction gear mechanism and the clutch mechanism are contained in a case together with an electric motor. According to the robot of the present invention, the operation of the robot is substantially unaffected by play when the motor rotates in a direction opposite to a direction in which the motor had been rotating because of the construction of the clutch mechanism. In addition, the construction and size of the driving device are respectively simple and compact because the clutch mechanism is designed to be operated by the compressed fluid and the coil springs. Furthermore, since the reduction gear mechanism and the clutch mechanism are contained in the case in addition to the motor, it is possible to improve the explosion-proof effect.

Other objects and further features of the present invention will be apparent from the following detailed description when read in conjunction with the accompanying drawings.

BRIEF DESCRIPTION OF THE DRAWINGS

FIG. 5 is a view in cross section showing another embodiment of the driving device of the industrial playback robot.

DETAILED DESCRIPTION

Figure 1:
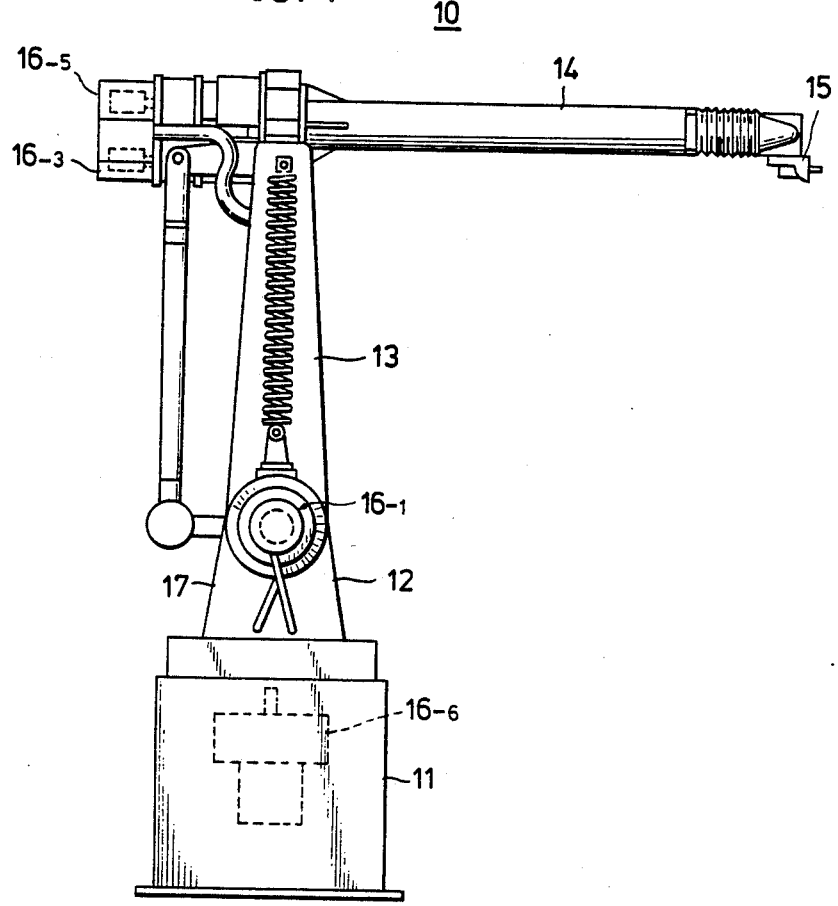
FIGS. 1 and 2 are a side view and a rear view respectively showing an embodiment of the industrial playback robot according to the present invention.
Figure 2:
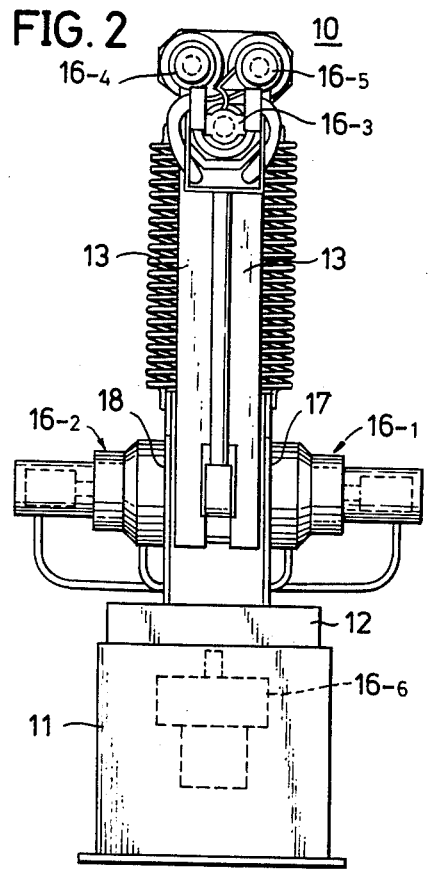

In FIGS. 1 and 2, an industrial playback robot 10 comprises a base 11, a rotatable base 12 rotatably provided on the base 11, a pair of beams 13 rotatably provided on the rotatable base 12, an arm 14 rotatably provided on ends of the beams 13, an operating member 15 provided on a tip end of the arm 14, and a plurality of driving devices 16-1 through 16-6.

The driving devices 16-1 and 16-2 are respectively mounted on brackets 17 and 18 of the rotatable base 12. The driving devices 16-3 through 16-5 are mounted on a base part of the arm 14. The driving device 16-6 is provided inside the base 11.

Figure 3:
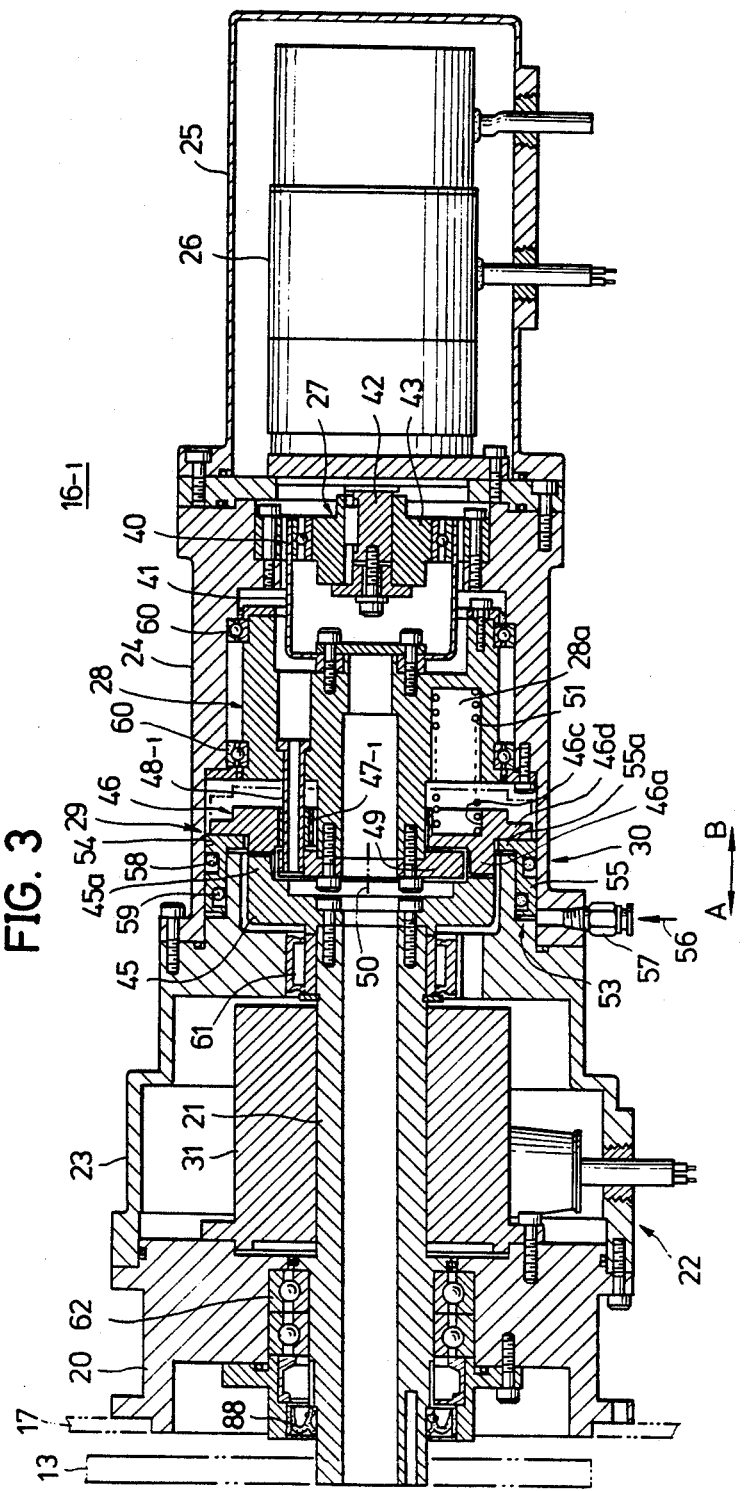
FIG. 3 is a view in cross section showing the internal construction of an embodiment of a driving device in the industrial playback robot shown in FIGS. 1 and 2.

FIG. 3 shows a concrete construction of an embodiment of the driving device 16-1. The driving device 16-1 comprises a case part 20 which is fixedly mounted on the bracket 17, and an output shaft 21 which is fixed to one of the beams 13. A case 22 comprises case parts 20, 23, 24 and 25. The case part 25 accommodates an electric motor 26. The case part 24 accommodates a harmonic drive (registered trademark) 27 which is used as a reduction gear mechanism, a shaft 28, a clutch mechanism 29 and a clutch engaging and disengaging mechanism 30. The case part 23 accommodates the output shaft 21 and a rotary position detector 31. The case part 20 accommodates the output shaft 21.

The harmonic drive 27 comprises a rigid internal gear 40 fixed to the case part 24, a ring-shaped gear member 41 in mesh with the internal gear 40, and an oval wave generator 43 which is fixed on a motor shaft 42 of the motor 26 and is fitted into an open end of the gear member 41. The gear member 41 is made of a flexible material and has a hollow cylindrical shape with a bottom. The shape of the open end of the gear member 41 is made oval by the wave generator 43 fitted therein, and teeth on both ends of the major axis of the oval shape are in mesh with the internal gear 40. The bottom of the gear member 41 is fixed on an end of the shaft 28 by screws.

As the wave generator 43 rotates, the gear member 41 undergoes a wave deformation in which the oval shape rotates, and the gear member 41 rotates by an amount corresponding to a difference in the numbers of teeth of the internal gear 40 and the gear member 41 in one revolution of the wave generator 43. For example, when the internal gear 40 has 240 teeth and the gear member 41 has 238 teeth, the gear member 41 rotates by an amount corresponding to two teeth. Accordingly, the harmonic drive 27 constitutes a reduction gear mechanism having a large speed reducing ratio.

Figure 4:
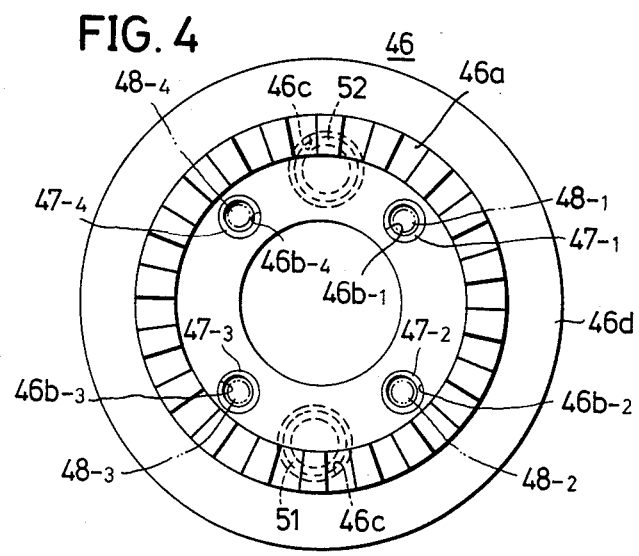
FIG. 4 is a side view showing a state where a movable clutch member shown in FIG. 3 is supported by guide members.

The clutch mechanism 29 comprises a fixed clutch member 45 fixed to an end of the output shaft 21 by screws, and a movable clutch member 46 shown in FIG. 4 provided on the shaft 28. The clutch members 45 and 46 comprise on confronting surfaces thereof teeth 45a and 46a arranged in a ring shape, respectively. FIG. 3 shows a state where the teeth 46a and 45a are in mesh and the clutch mechanism 29 is in an engaged state, that is, in a transmitting state where the clutch mechanism 29 can transmit rotation.

As shown in FIG. 4, the movable clutch member 46 comprises holes 46b-1 through 46b-4 at positions separated from a center thereof at equi-angular intervals. Guide bushes 47-1 through 47-4 are fitted into the respective holes 46b-1 through 46b-4. The clutch member 46 is fitted on guide members 48-1 through 48-4 via the guide bushes 47-1 through 47-4 without a gap.

As shown in FIG. 3, one end of the guide member 48-1 having a hollow cylindrical shape is fixed to a flange of the shaft 28 and the other end of the guide member 48-1 is fixed to a flange member 49 which is fixed on the other end of the shaft 28 by screws, so that the guide member 48-1 is parallel to an axis 50 of the shaft 28. The other guide members 48-2 through 48-4 are provided similarly to the guide member 48-1.

Accordingly, there is no play in the circumferential direction between the movable clutch member 46 and the shaft 28. The movable clutch member 46 is movable in directions A and B, and rotates unitarily with the shaft 28.

The clutch engaging and disengaging mechanism 30 comprises a pair of coil springs 51 and 52 shown in FIG. 4 for urging the movable clutch member 46 in the direction A, and a piston mechanism 53 for urging the movable clutch member 46 in the direction B. The coil spring 51 is fitted into and held by a depression 28a of the shaft 28 and a depression 46c of the movable clutch member 46. Although not shown, the coil 52 is held similarly to the coil spring 51.

The piston mechanism 53 comprises a ring-shaped cylinder chamber 54 formed by the case parts 23 and 24, and a ring-shaped piston member 55 fitted into the chamber 54. When compressed air is supplied to the chamber 54 via a port 57 as indicated by an arrow 56, the piston member 55 moves in the direction B, and a ring-shaped plate 55a on the right end of the piston member 55 pushes a flange 46d of the movable clutch member 46. Hence, the movable clutch member 46 moves in the direction B against the forces exerted by the coil springs 51 and 52 up to a position indicated by a two-dot chain line in FIG. 3, and the teeth 46a disengage from the teeth 45a. As a result, the clutch mechanism 29 is put into a disengaged state, that is, in a non-transmitting state where the clutch mechanism 29 cannot transmit rotation.

O-rings 58 and 59 are fitted on the piston member 55 so as to contact the inner and outer peripheral walls of the chamber 54, and the chamber 54 is maintained airtight. The shaft 28 is supported by a pair of ball bearings 60. The end of the output shaft 21 closer to the clutch mechanism 29 is supported by a needle bearing 61, and the other end of the output shaft 21 is supported by a ball bearing 62.

The other driving devices 16-2 through 16-6 are constructed similarly to the driving device 16-1 described heretofore, and description thereof will be omitted.

Next, description will be given with respect to the operation of the robot 10 and especially the operation associated with the driving device 16-1.

First, description will be given with respect to a teaching mode. In the teaching mode, compressed air is supplied via the port 57. Accordingly, the movable clutch member 46 is moved in the direction B and the clutch mechanism 29 is put into the disengaged state. In this state, the operator moves the operating member 15 and teaches the robot 10 a painting operation, for example, so that the robot 10 can play back the taught operation.

Accompanied by the movement of the operating member 15, the arm 14 rotates and the output shaft 21 rotates. However, the rotation of the output shaft 21 is not transmitted to the shaft 28 because the clutch mechanism 29 is in the disengaged state. For this reason, the teaching operation can be performed smoothly by a small operating force in the state where the load introduced by the harmonic drive 27 is released.

When the teaching operation is completed, the supply of the compressed air to the port 57 is cut off so as to release the pressure and make the pressure at the port 57 become atmospheric pressure. As a result, the movable clutch member 46 is moved in the direction A by the forces exerted by the coil springs 51 and 52 and the clutch mechanism 29 is put into the engaged state. In this state, the motor 26 is rotated, and the rotational speed of the motor shaft 46 is reduced by the harmonic drive 27. The motor shaft 46 rotates the beam 13 via the harmonic drive 27, the shaft 28, the clutch mechanism 29 and the output shaft 21, and the robot 10 operates as has been taught in the teaching mode.

The motor 26 repeats forward and backward rotations, and the shaft 28 accordingly repeats forward and backward rotations. Since there is no play in the circumferential direction between the movable clutch member 46 and the shaft 28, the rotation of the shaft 28 is transmitted to the output shaft 21 without delay even when the rotating direction of the shaft 28 reverses. In other words, the rotation of the shaft 28 is accurately transmitted to the output shaft 21, that is, to the beam 13. Therefore, the robot 10 can operate with a high accuracy.

No contact noise is generated when the rotating direction of the shaft 28 is reversed, and the robot 10 can operate quietly. Furthermore, the durability of the robot 10 is improved because there is no contact shock when the rotating direction of the shaft 28 is reversed. Further, a mechanical seal 88 for keeping the airtightness is provided between a projecting portion of the output shaft 21 and the case 22.

In addition, the entire driving device 16-1 is accommodated in the case 22, and the motor 26, the harmonic drive 27, the clutch mechanism 29, the clutch engaging and disengaging mechanism 30 and the rotary position detector 31 are isolated from the outside. For this reason, the driving device 16-1 has an explosion-proof structure and the safety factor is high.

FIG. 5 shows another embodiment of the driving device. In FIG. 5, those parts which are substantially the same as those corresponding parts in FIG. 3 are designated by the same reference numerals, and description thereof will be omitted.

A driving device 70 shown in FIG. 5 is designed so that the part of the output shaft 21 of the driving device 16-1 is eliminated. Thus, the driving device 70 is shorter in length and more compact compared to the driving device 16-1 described before. The beam 13 is fixed to one end of an output shaft 71 which corresponds to the shaft 28 shown in FIG. 3. The other end of the output shaft 71 is fixed to the gear member 41 of the harmonic drive 27 by screws.

A clutch mechanism 72 comprises a movable clutch member 73 and a ring-shaped clutch member 74 which is fixed to the internal gear 40 by screws. The movable clutch member 73 comprises holes 73a provided on an outer peripheral part thereof, and guide pins 78 are fit into the respective holes 73a. The guide pins 78 are fixed on a case 76 and are parallel to an axis 77 of the output shaft 71. The holes 73a and the guide pins 78 are respectively provided at equi-angular intervals. Hence, the movable clutch member 73 is movable in directions C and D without play in the circumferential direction of the output shaft 71.

A clutch engaging and disengaging mechanism 79 is formed in the case 76, and comprises a cylinder chamber 82 which is supplied with compressed air via a port 81 as indicated by an arrow 80 and a pair of coil springs 83 for urging the movable clutch member 73 in the direction D. The coil springs 83 are fitted into and held by depressions 76a and 73b respectively formed in the movable clutch member 73 and the case 76. The internal gear 40 and the clutch member 74 are provided unitarily and are supported against the case 76 by ball bearings 84.

In the teaching mode, the compressed air is supplied to the chamber 82 and the movable clutch member 73 itself acts as a piston and moves in the direction C against the forces exerted by the coil springs 83. Hence, teeth 73c arranged in a ring shape on the movable clutch member 73 disengage the mesh with teeth 74a arranged in a ring shape on the clutch member 74, and the clutch mechanism 72 is put into a disengaged state. Consequently, the internal gear 40 can rotate freely and the harmonic drive 27 will not function as the reduction gear mechanism. In this state, the gear member 41 and the wave generator 43 can rotate unitarily.

The rotation of the output shaft 71 caused by the teaching operation is transmitted to the motor 26 via the gear member 41 and the wave generator 43, and the teaching operation is performed while rotating the motor shaft 42. In this state, the harmonic drive 27 simply acts as a shaft and does not act as a load. For this reason, the teaching operation can be performed smoothly by use of only a small operating force.

Because the internal gear 40 and the clutch member 74 are supported by the case 74 as described before, the weights of the internal gear 40 and the clutch member 74 will not act on the motor shaft 42. As a result, there is an advantage in that the rotational load on the motor shaft 42 is further reduced in the teaching mode.

O-rings 85 and 86 are provided on the movable clutch member 73 so that the chamber 82 is kept airtight even while the movable clutch member 73 moves.

When the teaching operation is completed, the supply of the compressed air to the port 81 is cut off. Hence, the movable clutch member 73 moves in the direction D against the forces exerted by the coil springs 83, and the clutch mechanism 72 is put into an engaged state shown in FIG. 5 where the teeth 73c are in mesh with the teeth 74a. Accordingly, the rotation of the internal gear 40 is restricted, and the harmonic drive 27 can operate normally.

When the motor 26 is rotated, the rotational speed of the motor shaft 42 is reduced by the harmonic drive 27 and the rotation is transmitted to the output shaft 71. The beam 13 is thus rotated, and the robot 10 shown in FIGS. 1 and 2 operate as has been taught in the teaching mode.

When the rotating direction of the motor 26 is reversed, a torque acts on the internal gear 40 in a direction opposite to a direction in which a torque had been acting thereon. However, since the movable clutch member 73 has no play in the rotating direction thereof, the internal gear 40 will not rotate at all. For this reason, when the rotating direction of the motor 26 is reversed, the harmonic drive 27 performs a normal speed reducing operation from the start of the rotation in the reverse direction similarly as in the case where the internal gear 40 is fixed on the case 76 by screws. As a result, the output shaft 71 rotates at the normal speed from the start of the rotation of the motor 26 in the reverse direction. Therefore, the robot 10 can operate with a high accuracy.

The part of the output shaft 71 closer to the one end thereof is supported against the case 76 by a pair of ball bearings 87. Further, the mechanical seal 88 for keeping the airtightness is provided between a projecting portion of the output shaft 71 and the case 76.

The entire driving device 70 is accommodated within the case 76 similarly as in the case of the driving device 16-1 shown in FIG. 3. In addition, the inside of the case 76 is pressurized by protecting gas such as inert gas and air, so as to prevent the surrounding flammable gas from entering into the case 76. The protecting gas is supplied to a port 91 as indicated by an arrow 90 and is circulated within the case 76 by being passed through a gap 92 on the periphery of the rotary position detector 31, passed through passages 93 and 94, passed by the harmonic drive 27, passed through a passage 95 to a space 96 on the periphery of the motor 26 and led out via a port 97 as indicated by an arrow 98. In this case, the protecting gas also acts as a coolant, and the mechanisms and members inside the case 76 are cooled efficiently by the circulated protecting gas.

It is possible to maintain the inside of the case 76 to a high pressure by providing a throttle at the port 97. In addition, when the inside of the case 76 need not be cooled to a large extent, the port 97 may be closed so as to maintain the inside of the case 76 to a high pressure.

It is possible to design the clutch engaging and disengaging mechanism so that the clutch mechanisms 29 and 72 are put into the engaged state when the compressed air is supplied and is disengaged when the supply of the compressed air is cut off. Instead of the compressed air which is used as the driving source for the clutch engaging and disengaging mechanism, it is also possible to use oil pressure.

In the state where the driving device 70 is assembled, virtually all of the constituent members of the driving device 70 are accommodated within the case 76. For this reason, it is possible to use for the constituent members of the driving device 70 members which are not especially designed to be explosion-proof, and the selection range in which the constituent members of the driving device 70 can be selected is enlarged. Moreover, it is possible to make the driving device 70 explosion-proof with a simple construction because the constituent members of the driving device 70 can be made explosion-proof by supplying the protecting gas into the single case 76, and the size of the driving device 70 itself can be effectively reduced. In addition, since the harmonic drive 27, the clutch mechanism 72 and the rotary position detector 31 having the ring shapes are arranged around the electric motor 26 and the output shaft 71, it is possible to further reduce the size of the driving device 70 compared to the driving device of the previous embodiment.

As described before, the rotary position detector 31 detects the rotary position of the output shaft 21 (or 71) which is fixed to the beam 13. Thus, it is possible to accurately detect the rotary position of the output shaft 21 (or 71) without being affected by the clutch mechanism 29 (or 72), and an accurate detection signal can be obtained from the position detector 31. The output detection signal of the position detector 31 is fed back to a control means (not shown) of the robot and the driving device 16-1 (or 70) is accurately driven responsive to an output signal of the control means.

In each of the embodiments described heretofore, it is possible to use a cycloidal reduction gear instead of the harmonic drive 27, and an electric solenoid may be used for the clutch engaging and disengaging mechanism. It is also possible to use a friction clutch instead of the clutch mechanism 29 (or 72) which is a jaw clutch.

Further, the present invention is not limited to these embodiments, but various variations and modifications may be made without departing from the scope of the present invention.

What is claimed is:

1. A playback industrial robot comprising:
   at least one driving device; and
   an electric motor provided in said driving device and having a motor shaft;
   said driving device comprising a reduction gear mechanism for reducing a rotational speed of the motor shaft of said electric motor; a rotatable output shaft for operating the playback industrial robot; a clutch mechanism which is in a disengaged state when said output shaft rotates in a teaching mode so that said reduction gear mechanism does not act as a load; a clutch engaging and disengaging mechanism for putting said clutch mechanism is an engaged state depending on supply and cutting off of the supply of compressed fluid when the teaching mode is started; a case for accommodating said electric motor, said reduction gear mechanism, said output shaft, said clutch mechanism, said clutch engaging and disengaging mechanism; and a rotary position detector for detecting a rotary position of said output shaft,
   said case including a port through which protecting gas is supplied to the inside of said case, and passages for said protecting gas on the inside of said case,
   said clutch mechanism comprising a movable clutch member applied with a rotary force depending on forward and backward rotations of said electric motor and guide members arranged in parallel to said output shaft at positions separated from a center of said output shaft toward an outer peripheral direction of said output shaft, said movable clutch member being provided on said guide members so as to be non-rotatable but movable in an axial direction of said output shaft.

2. A playback industrial robot as claimed in claim 1 in which said reduction gear mechanism comprises a shaft on an output side thereof, said clutch mechanism being provided between said shaft of said reduction gear mechanism and said output shaft, said guide members being fixed on said shaft of said reduction gear mechanism, said movable clutch member comprising holes formed in correspondence with said guide members fitted therein.

3. A playback industrial robot as claimed in claim 1 in which said reduction gear mechanism comprises an internal gear rotatably supported within said case and a gear member fixed on said output shaft and meshing with said internal gear from an inner side of said internal gear, said reduction gear mechanism having a speed reducing function when said internal gear is non-rotatable and having no speed reducing function when said internal gear is rotatable, said guide members being fixed on said case, said movable clutch member comprising holes formed in correspondence with said guide members fitted therein, said movable clutch member making said internal gear freely rotatable in the disengaged state of said clutch mechanism and engaging said internal gear to make said internal gear non-rotatable in the engaged state of said clutch mechanism.

4. A playback industrial robot as claimed in claim 1 in which said clutch engaging and disengaging mechanism comprises coil springs for urging said movable clutch member in one direction, and a mechanism for moving said movable clutch member against forces exerted by said coil springs by a supply of compressed fluid from outside.

* * * * *